United States Patent
Derynck et al.

(10) Patent No.: US 11,085,852 B2
(45) Date of Patent: Aug. 10, 2021

(54) AGRICULTURAL SYSTEM

(71) Applicant: CNH Industrial America LLC, New Holland, PA (US)

(72) Inventors: Lynn Derynck, Moere (BE); Olivier Helewaut, Ruddervoorde (BE); Yves Loosfelt, Zulte (BE); David S. D'Hondt, Zedelgem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/090,492

(22) Filed: Nov. 5, 2020

(65) Prior Publication Data

US 2021/0140848 A1 May 13, 2021

(30) Foreign Application Priority Data

Nov. 8, 2019 (EP) .................................... 19208178

(51) Int. Cl.
| | |
|---|---|
| *A01F 15/08* | (2006.01) |
| *A01F 15/04* | (2006.01) |
| *G01M 13/04* | (2019.01) |
| *G01L 5/00* | (2006.01) |

(52) U.S. Cl.
CPC ........... *G01M 13/04* (2013.01); *A01F 15/042* (2013.01); *A01F 15/0841* (2013.01); *G01L 5/0009* (2013.01)

(58) Field of Classification Search
CPC .... A01F 15/08; A01F 15/042; A01F 15/0841; A01D 41/127; A01D 69/002; A01D 75/182; G01L 5/009; G01M 13/04; B30B 9/30; B30B 15/22; F16C 17/246; F16C 19/52

See application file for complete search history.

(56) References Cited

U.S. PATENT DOCUMENTS

| | | | | |
|---|---|---|---|---|
| 6,101,932 A | * | 8/2000 | Wilkens | A01F 15/0825 100/192 |
| 6,457,405 B1 | * | 10/2002 | Lippens | A01F 15/0825 100/192 |
| 2015/0128718 A1 | * | 5/2015 | Vandamme | A01F 15/04 73/818 |
| 2017/0367268 A1 | * | 12/2017 | Lang | A01F 15/0825 |

FOREIGN PATENT DOCUMENTS

| | | |
|---|---|---|
| EP | 1495669 A1 | 1/2005 |
| EP | 3245862 A1 | 11/2017 |
| EP | 3262921 A1 | 1/2018 |

OTHER PUBLICATIONS

Extended European Search Report for EP application 19208178.4, dated May 7, 2020 (6 pages).

* cited by examiner

*Primary Examiner* — Jimmy T Nguyen
(74) *Attorney, Agent, or Firm* — Peter Zacharias; Patrick Sheldrake (57) ABSTRACT

An agricultural system including: an agricultural baler with a bale-forming chamber; a plunger movable in a reciprocating manner within the bale-forming chamber for compressing plant matter in the bale-forming chamber; and a driveline for moving the plunger within the bale-forming chamber. The driveline comprises at least one bearing. The agricultural system further includes a control unit configured to: receive load-data indicative of a load acting on the plunger during operation of the baler; and determine a bearing-status-signal indicative of wear status the bearing, based on the load-data.

14 Claims, 5 Drawing Sheets

AGRICULTURAL SYSTEM

BACKGROUND OF THE INVENTION

The invention relates to an agricultural system comprising an agricultural baler, particularly but not exclusively, a baler implement. Other aspects of the present invention relate to a method of controlling an agricultural baler and a corresponding computer program.

Balers are well known in agriculture and are widely used to bale plant matter in fields into bales that may be conveniently and effectively handled, stored and used. Balers are known that bale forage products such as grass and other leaves used as hay or other types of animal feed; straw or other plant parts resulting as by-products from a harvesting operation to such as combine harvesting; cotton; and other plant parts of commercial or other value.

The majority of balers in use in Europe are designed to be towed behind an agricultural tractor or another towing vehicle that, under the control of an operator and/or using operator-monitored software, moves the baler about a field and provides power to operate internal parts of the baler. The provision of power is effected by way of a rotatable power take-off (PTO) shaft connected to the rotary power take-off that typically is part of the tractor.

Known designs of agricultural baler include a pick-up, mounted at the front of the machine, that causes the ingestion of plant matter into the interior of the machine as it moves about a field. Differing internal designs of baler components are known in the part of the machine downstream of the pick-up.

One commonplace type of baler is often referred to as a "rectangular baler". This includes a cuboidal bale-forming chamber in which the ingested plant matter is compacted into a cuboidal shape by a piston or plunger that reciprocates longitudinally back and forth inside the bale-forming chamber between retracted and extended positions. Charges of plant matter repeatedly are fed into the bale-forming chamber from the pick-up by the mechanism of the baler. This action is timed with the motion of the plunger such that feeding of plant matter coincides with retraction of the plunger to one end of the bale-forming chamber. The plant matter then is compacted by subsequent extension strokes of the plunger along the bale-forming chamber.

The reciprocal rectilinear motion of the plunger is effected using a driveline that converts rotary drive derived from the rotating PTO shaft, connected to the baler above the pick-up, into reciprocal motion of the plunger. This typically is achieved by changing, in the driveline, the axis of the rotation from one parallel to the longitudinal length of the baler to an axis of rotation transverse thereto.

Such transverse-axis rotation is applied to a crank that is pivot-jointed to one end of a conrod the other end of which is pivot-jointed to the plunger, that is moveably captive inside the bale-forming chamber. As a result, rotation of the crank causes the reciprocal movement of the plunger.

The driveline between the power take-off of the tractor and the plunger includes a clutch that in a typical case is formed of two or more dry friction plates that are urged into mutual engagement by a hydraulic actuator or spring arrangement. Additionally a heavy flywheel (that in some baler designs weighs 600 kg or more) is secured to a rotatable shaft that defines or is connected to an input shaft in turn connected in use to the PTO shaft.

The flywheel is needed because the plunger during its motion is associated with very high, and highly varying, levels of power that might peak at 1500 Hp (about 1100 kW). In the to absence of the flywheel it might be impossible for the rotary power take-off of a tractor to provide sufficient power to move the plunger, and very high forces might be transmitted back towards the tractor via the PTO shaft potentially causing damage to the baler or tractor or making the tractor-baler combination difficult to control.

The flywheel and the plunger present a system having a high level of inertia and, in some cases, mechanical resistance (especially when the driveline is at rest or is moving slowly). The inertia and mechanical resistance can be increased by factors such as:

The at-rest plunger position causing an unfavourable conrod transmission angle with the consequence that plunger movement is difficult to initiate;

Plant matter in the bale-forming chamber resisting movement of the plunger; and/or Larger, less compressible items, such as tree branches, litter and stones, impeding movement of the plunger in the bale-forming chamber.

Often the output power of the tractor that is connected to tow and power the baler is poorly matched to the energy requirements of such a system, and in some cases, it is not known what the power output of the tractor may be. Such factors lead to numerous practical problems.

If the power output of the tractor is high, and as explained the inertia and/or mechanical resistance of the flywheel/plunger system also is high, the engagement of drive via a PTO shaft connected to the tractor can cause excessive slip in the clutch.

Such slip can occur suddenly, especially when the power output of the tractor is unexpectedly high or is poorly controlled by the tractor driver. The slipping arises instead of movement of the plunger as is desired, because at such a time the driveline components on the flywheel/plunger side of the clutch may effectively appear as a very high or infinite resistance to the motion of the PTO shaft.

Slipping of the clutch can cause a very rapid temperature increase in the parts of the clutch. This gives rise to premature failure of the friction material of the clutch plates, with clutch burn-out sometimes occurring just a few seconds (e.g. 1-5 seconds) after engagement of rotary drive in the PTO shaft.

Clutch burn-out of this kind is highly inconvenient, as a minimum requiring replacement of part or all of the clutch. It may be necessary to wait a lengthy period after burn-out has occurred until the parts of the clutch are cool enough to be handled during replacement. The location of the clutch parts may mean that substantial dismantling of the baler is necessary before the clutch can be replaced. The friction plates and parts connected to them may be distorted or welded together in ways making their replacement difficult and time-consuming.

Even if the clutch does not burn out as a result of excessive slip, such a phenomenon to shortens the service life of the clutch and presents a significant fire risk (for example in the event of dry plant matter or other combustible material such as hydraulic fluid coming into contact with the overheated clutch or other driveline parts). A fire in a baler typically presents a serious risk to the safety of personnel nearby and a risk of damage to other machinery such as a towing tractor.

Also such an event nearly always results in the burning of valuable plant matter lying in a field; and since balers frequently operate in locations removed from public roads it can be difficult for fire tenders to provide assistance.

Other problems arise if the power output of the towing tractor is too low.

In such a situation the energy of the PTO shaft may be insufficient to cause either movement of the plunger or slipping of the baler driveline clutch, with the result that on engagement of the power take-off the engine of the tractor stalls. This may cause damage to the power take-off components or in some cases the engine of the tractor. Even if these outcomes do not occur, the inevitable interruptions in the baling activity are undesirable because of their adverse effect on bale quality and integrity and the wasting of commercially valuable plant matter.

Some tractor power take-offs include one or more PTO clutches intended to protect the tractor engine by preventing stalling caused as described above. In such systems although engagement of rotary drive via the power take-off would not result in engine damage, a likely outcome is inconsistent baling resulting from the failure to drive the plunger. Moreover in some cases various forms of manual (operator) intervention may be required. This adversely affects the efficiency of baling operations.

A tractor operator who becomes aware that the tractor is under-powered as explained may adjust the settings of the baler e.g. during start-up in order to reduce the density of the bales produced by the machine to levels appropriate to the power output of the tractor. Although this may avoid problems such as those explained above, the result may be a low-density bale the commercial value of which is less than a bale of higher density.

Particularly, in high density baling the loads on the plunger and the driveline moving the plunger within the bale chamber are significant. Over time, such loads will result in wear of the driveline parts, particularly bearings. If bearing failure is not detected promptly, excessive heat may be generated, possibly leading to fires within the baler.

The present disclosure seeks to solve or ameliorate one or more problems of prior art balers.

Embodiments of the disclosure are suitable for inclusion in all baler types and machinery combinations disclosed herein. The disclosure of embodiments or parts of embodiments herein includes their disclosure in combination with all baler types and to machinery combinations herein, even if these are indicated as forming part of the prior art.

The terms "baler" and "baler" are used synonymously herein and in the art generally.

The term "power take-off" is synonymous with the acronym "PTO".

The term "tractor" embraces a wide variety of machines potentially capable of towing a baler, as will be known to the person of skill in the art.

The term "clutch" except as otherwise explained embraces any design of clutch that is suitable for transferring drive in the circumstances described.

The term "plant matter" and derivatives potentially includes all types of matter that potentially may be ingested into a baler for the purpose of being formed into bales.

The terms "piston" and "plunger" in the context of the principal, moveable, bale-forming part of a bale-forming chamber are used synonymously herein.

SUMMARY OF THE INVENTION

Aspects and embodiments of the disclosure provide an agricultural baler and a method for controlling an agricultural baler as claimed in the appended claims.

According to a first aspect of the present disclosure, there is provided an agricultural system comprising an agricultural baler that comprises:
  a bale-forming chamber;
  a plunger movable in a reciprocating manner within the bale-forming chamber for compressing plant matter in the bale-forming chamber; and
  a driveline for moving the plunger within the bale-forming chamber, wherein the driveline comprises at least one bearing;

The system further comprises a control unit configured to receive load-data indicative of a load acting on the plunger during operation of the baler and configured to determine a bearing-status-signal indicative of wear status the bearing, on the basis of the load-data.

In another embodiment, determining the bearing-status-signal comprises identifying non-contact-load-values, representative of load values of the load-data that correspond to phases during the plunger operation in which the plunger is not in contact with plant matter.

In another embodiment, the non-contact-load-values correspond to load values of the load-data during retraction of the plunger.

In another embodiment, the driveline comprises at least one crank member for converting rotational motion of a crankshaft into a reciprocating motion of the plunger, and wherein identifying non-contact-load-values comprises identifying load-data associated with predetermined angular positions of the crank or the crankshaft.

In another embodiment, determining the bearing-status-signal comprises comparing one or more of the non-contact-load-values to a first predetermined load threshold.

In another embodiment, the control unit is configured to generate a maintenance-signal to for informing the operator and/or requesting a bearing service if one or more of the non-contact-load-values exceed the first predetermined load threshold.

In another embodiment, determining the bearing-status-signal comprises comparing one or more non-contact-load-values to a second predetermined load threshold, and wherein the control unit is configured to automatically stop an operation of the agricultural baler, if one or more of the non-contact-load-values exceed the second predetermined load threshold.

In another embodiment, the driveline comprises at least one clutch arranged between an input shaft and a flywheel of the baler, and wherein the control unit is configured to automatically disengage the clutch, if one or more of the non-contact-load-values exceed the first or the second predetermined load threshold.

In another embodiment, the driveline comprises at least one brake between an input shaft and a flywheel of the baler, and wherein the control unit is configured to automatically activate the break, if one or more of the non-contact-load-values exceed the first or the second predetermined load threshold.

In another embodiment, the agricultural baler comprises a sensor arrangement for generating the load-data, the sensor arrangement comprising at least one load sensor configured to determine values of the load-data during operation of the baler.

In another embodiment, the driveline comprises at least one crank member for converting rotational motion of a crankshaft into a reciprocating motion of the plunger, and wherein the at least one load sensor is arranged between the at least one crank member (33) and the plunger.

In another embodiment, the driveline comprises at least one conrod for connecting the at least one crank member to the plunger, wherein the conrod has a first end connected to the at least one crank member via the at least one bearing, and/or wherein the conrod has a second end connected to the plunger via the at least one bearing, and wherein the load sensor is connected to the at least one bearing.

In another embodiment, the at least one load sensor is a force transducer for converting the plunger load into an electrical signal.

According to another aspect of the present disclosure, there is provided a computer-implemented method for controlling an agricultural baler, said baler comprising a bale-forming chamber, a plunger movable in a reciprocating manner within the bale-forming chamber for compressing plant matter in the bale-forming chamber, and a driveline for moving the plunger within the bale-forming chamber, wherein the driveline comprises at least one bearing. The method comprises receiving load-data indicative of a load acting on the plunger during operation of the baler and determining a bearing-status-signal indicative of wear status the to bearing, on the basis of the load-data.

According to another aspect of the present disclosure, there is provided a computer program configured to perform the above method or to configure the above control unit.

According to another aspect of the present disclosure, there is provided an agricultural machinery comprising any agricultural baler disclosed herein (e.g. a baler implement), a control unit and an agricultural vehicle for transporting the agricultural baler implement. There may be provided a computer program, which when run on a computer, causes the computer to configure any apparatus, including a control unit, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device or may be embodied as a transient signal. Such a transient signal may be a network download, including an internet download.

The agricultural work vehicle (or tractor) may include one or more control devices, such as but not limited to programmable or non-programmable processors. Similarly, the baler implement may include one or more control devices, such as but not limited to programmable or non-programmable processors. Additionally, or alternatively, the baler implement may be controlled by one or more control devices of the agricultural work vehicle. Similarly, the agricultural work vehicle may be controlled by one or more control devices of the baler implement.

The agricultural work vehicle and/or the baler implement may be remote controlled, e.g. from a farm office. Accordingly, the agricultural work vehicle may include one or more communication interfaces for connection to a remote processor and/or a remote controller. Similarly, the baler implement may include one or more communication interfaces for connection to a remote processor and/or a remote controller.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE DRAWINGS

Referring to the drawings a baler 10 is shown being towed behind an agricultural work vehicle (towing vehicle) that in the illustrated embodiment non-limitingly is an agricultural tractor 11.

The tractor 11 is a conventional tractor including a vehicle frame/body 11a, rear-mounted cab 11b, front, steerable, ground-engaging wheels 11c and rear, driven, ground-engaging wheels 11d. Tractor 11 includes at its rear end between the rear wheels 11d a power take-off 12 of a conventional design that includes a rotative coupling for a PTO shaft 13 that extends rearwardly of the tractor 11. The PTO 12 may be engaged to cause rotation of the PTO shaft 13 or disengaged, such that the shaft 13 is not powered to rotate, for example through the operation of a control lever or pushbutton.

The tractor 11 may have any of a range of engine power outputs including but not limited to 200 hp, 300 hp and 400 hp. The baler 10 is operable when towed by any such tractor 11, without a need for adjustment or modification, for the reasons explained below.

The PTO shaft 13 may be any of a variety of lengths. A relatively short PTO shaft 13 and drawbar 14 (described below) minimises the distance between the pick-up 19 (described below) of the baler 10 and the tractor 10. This provides certain advantages, although in some other respects a longer PTO shaft 13 may provide good adjustment flexibility.

The partial driveline represented by the PTO 12 and PTO shaft 13 may in various types of tractor include a PTO clutch 20 that as described above seeks to protect the engine of the tractor 11 from damage caused e.g. when an excessive loading on the PTO shaft causes engine stalling. The PTO clutch 20 is shown schematically in FIG. 1. It may readily be envisaged by the person of skill in the art and typically would be a one-way clutch of a kind that permits free movement when rotating in one direction, and transfers rotary drive via the PTO shaft 13 when rotating in the opposite direction. Other forms and locations are possible in respect of the clutch 20.

The baler 10, i.e. a baling implement, is secured to the rear of the tractor 11 by way of a drawbar 14 that typically is of an "A"-shape when viewed in plan and extends forwardly of the baler 10 below the PTO shaft 13. The drawbar 14 is pivotably secured to a conventional towing hitch at the rear of the tractor 11.

The baler 10 includes a housing or cover 16 that may take a variety of forms. The housing 16 in most baler designs includes a section 16a that is open to permit ejection of formed bales at the rear of the baler 10.

Panels defining the housing 16 further may be openable or removable in order to permit maintenance of the interior parts of the baler 10 replacement of bobbins of twine used for tying completed bales or the clearance of blockages that can arise for a variety of reasons.

Figure 1:
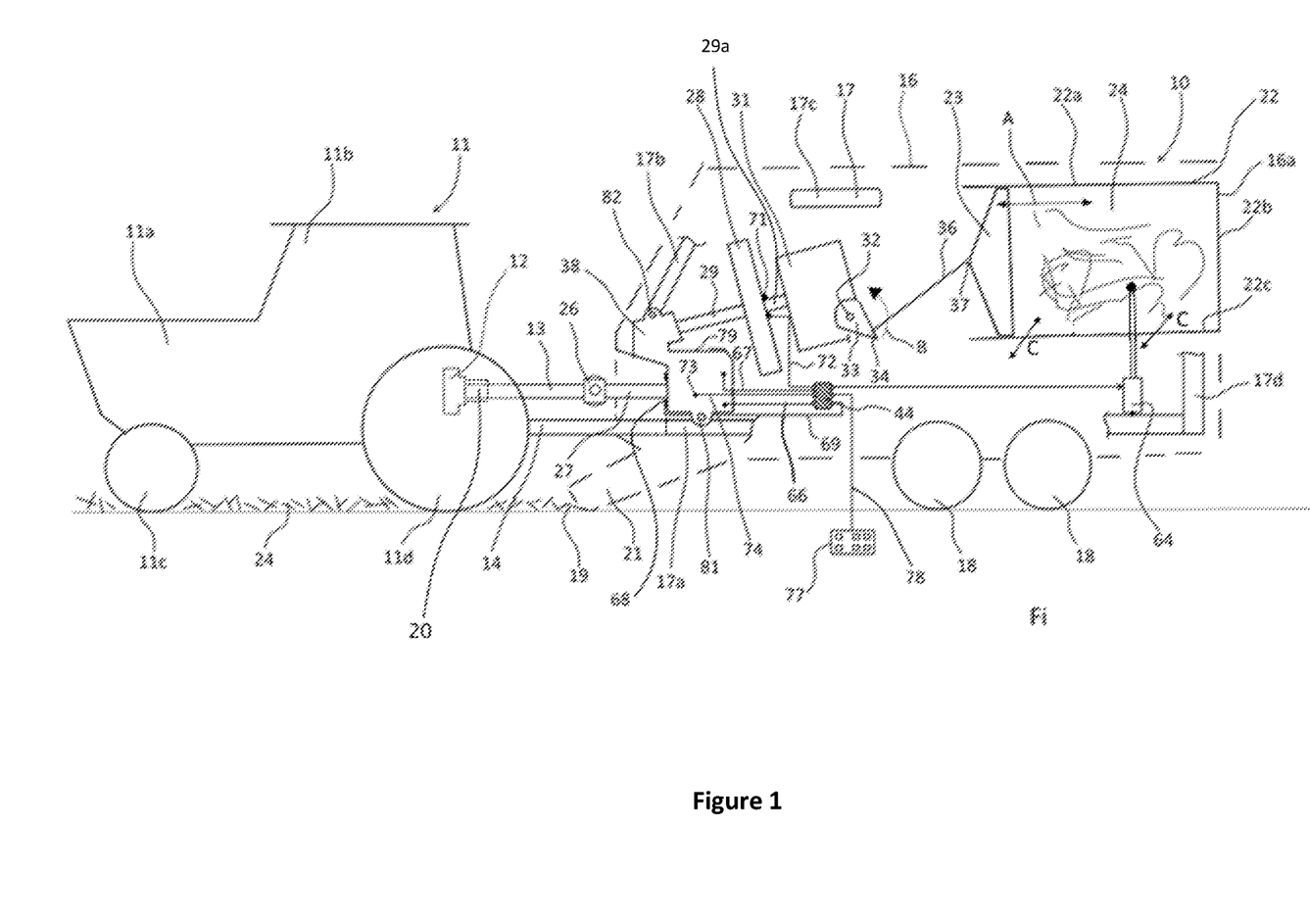
FIG. 1 is a schematic representation of an agricultural system comprising a baler implement and a work vehicle.

The housing 16 of the baler 10 is secured to a baler frame 17 selected parts 17a, 17b, 17c, 17d of which are illustrated in FIG. 1, with the complete frame 17 being omitted for ease of illustration.

The baler 10 is mobile and to this end it includes secured to the frame 17 two or more ground-engaging wheels 18.

In the embodiment illustrated, four wheels are provided, being left and right front wheels and left and right rear wheels 18. In FIG. 1 the left-hand side front and rear wheels are visible.

In this regard the front or forward end of the baler 10 is the end of it that is closest to the towing tractor 11, and the terms "rear", "left", "right", "upper", "lower" and derivative terms are interpreted accordingly and as though an observer is looking forwardly along the baler 10.

The wheels 18 may be mounted relative to the frame 17 by way of suspension components and passive or active steering components as would be known to the person of skill in the art, or they may be mounted more simply. The wheels 18 optionally may include tyres and/or gripping elements that are omitted from FIG. 1 for ease of viewing.

A pick-up 19 projects forwardly of the baler 10 and is arranged to collect cut plant matter 24 lying in a field in which the baler 10 moves as influenced by the motion of the tractor 11. The pick-up 19 passes the plant matter to a conveyor 21. The conveyor 21 conveys the plant matter inside the baler 10 where it undergoes baling.

Numerous designs of pick-up 19 and conveyor 21 are known in the baler art and fall within the scope of embodiments disclosed herein. The precise designs of the pick-up 19 and conveyor 21 are essentially immaterial to the nature and operation of the invention, and therefore are not described in detail.

As mentioned, the baler 10 includes an internal bale-forming chamber 22. This is an elongate, cuboidal volume defined by chamber walls of which top and bottom walls 22a and 22c are visible in FIG. 1. The bale-forming chamber 22 in a typical baler design extends in a fore and aft direction in an upper part of the rear of the volume enclosed by the housing 16.

The rear 22b of the bale-forming chamber coincides with the aforementioned open housing section 16a in order to allow ejection of completed bales in a per se known manner.

A crop flow path exists inside the baler 10 between the conveyor 21 and the bale-forming chamber 22. The crop flow path may readily be envisaged and is omitted from the figures for clarity.

The forwardmost end of the bale-forming chamber 22 is essentially open. A plunger 23 occupies the interior cross-section of the bale-forming chamber 22 and is constrained to move longitudinally inside the chamber 22 from the open, forward end towards and away from the rear 22b of the bale-forming chamber 22 as signified by arrow A.

The PTO shaft 13 as mentioned may be powered to rotate, in virtually all tractors in a clockwise direction when viewed from behind the tractor 11. PTO shaft 13 is connected by way of at least one, and in practice at least two, universal joint 26 to the forwardmost end of a rotary input shaft 27 of the baler 10. The universal joint 26 in a well-known manner accommodates changes in the relative orientation of the tractor 11 and baler 10 that result from towing of the baler from place to place, e.g. while the baler is working or when it is travelling between fields.

The input shaft 27 is supported e.g. using journal bearings that are omitted from FIG. 1 for ease of viewing and connects by way of a driveline, described in more detail below, to a rotatable flywheel 28.

Flywheel 28 is supported on a flywheel shaft 29 that also is supported using journal bearings, or a functionally similar arrangement, that further is omitted from FIG. 1. The functions of the flywheel 28 are as described above, although as explained it is possible for the flywheel 28 in embodiments of the invention to be made considerably lighter than some prior art flywheels.

The rear end 29a of the flywheel shaft 29 is a rotary input to a drive converter 31 or similar transmission that by way of intermeshing gear components alters the axis of rotation of rotative energy in the baler 10. This drive converter 31 may be referred to as a main transmission in some examples.

The nature of the drive converter 31 thus is such that the longitudinally extending (with reference to the elongate length of the baler 10 as illustrated) axis of rotation of the flywheel shaft 29 becomes rotation about a transversely extending axis of a crankshaft 32.

The crankshaft 32 is connected to a pair of crank members (only the right one is shown as 33) that protrude from the drive converter 31 in a manner presenting free ends. The pair of crank members and corresponding conrods (only the right one shown as 36) connect the crankshaft 32 of the drive converter 31 with the forward side of the plunger 23. A first, right side crank member 33 has a first end connected to the crankshaft 32 of the drive converter 31. A second end of the first, right side crank member 33 is connected to a first end 34 of a first, right side conrod 36. The first, right side conrod 36 has a second end 37 connected to the plunger 23. A second, left side crank member (not shown) has a first end connected to the crankshaft 33 of the drive converter 31. A second end of the second, left side crank member is connected to a first end of a second, left side conrod (not shown). The second, left side conrod has a second end (not shown) connected to the plunger 23.

The first ends of the conrods (e.g. first end 34) are connected to their respective crank members (e.g. right side crank member 33) via rotational bearings (not shown). The second ends of the conrods (e.g. second end 37) are connected to the plunger 23 via rotational bearings (not shown). Some or all of the bearings may be provided with strain gauges that function as load cells to enable determination of a load force experienced by the plunger 23 during the baling process. The load cells are preferably provided on both sides of the drive converter 31, e.g. one on the first, right side conrod 36 and one on the second, left side conrod (not shown). By providing load cells on both sides of the drive converter 31 (i.e. on both conrods), the loads acting on both the left and right side of the plunger may be monitored. Of course, load cells may be provided at any other point suitable for detecting the load acting on the plunger during the various phases of the stroke. The load force sensed by the load cells is typically highest when the plunger 23 engages with the crop in the bale-forming chamber 22.

As is apparent from FIG. 1, therefore, rotation of crankshaft 32 causes rotation of crank member 33, as signified by arrow B, that gives rise to the rectilinear, reciprocal motion of plunger 23 indicated by arrow A.

In this regard it is somewhat arbitrary whether crank 33 rotates clockwise or anti-clockwise, since reciprocal motion of the plunger 23 may in an appropriately designed set of driveline elements be achieved regardless of the direction of rotation of the crank 33. The actual rotational direction of the crank 33 would be a consequence of the internal design of the drive converter 31. Such aspects are not relevant to an understanding of the invention, and to therefore are not provided in detail herein.

Charges of plant matter 24 conveyed inside the baler 10 from the conveyor 21 repeatedly are at intervals fed by internal components of the baler 10, that are omitted from FIG. 1 for clarity, into the interior of the bale-forming chamber 22 for compaction by reason of the reciprocal, rectilinear motion (arrow A) of the plunger 23. The feeding of each charge of plant matter 24 is timed to coincide with positioning of the plunger 23 at its retracted, i.e. forwardmost position, with the result that the plant matter 24 becomes compressed and compacted by the movement of the plunger 23 into bale form after it has been fed in to the bale-forming chamber 22.

The driveline defined between the input shaft 27 and the flywheel shaft 29 includes a transmission 38 that is described below in relation to FIGS. 2 and 3.

Figure 2:
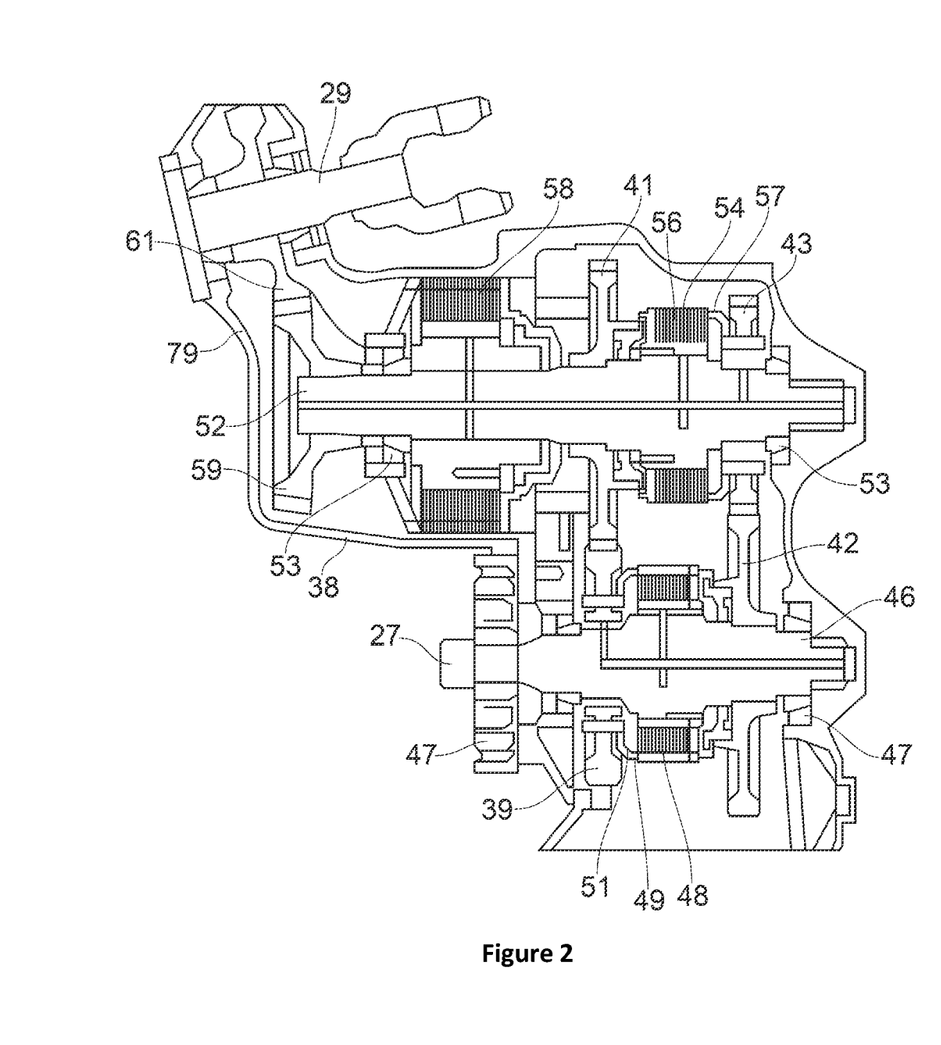
FIG. 2 is a cross-sectional view of a transmission, forming part of the baler visible in FIG. 1.
Figure 3:
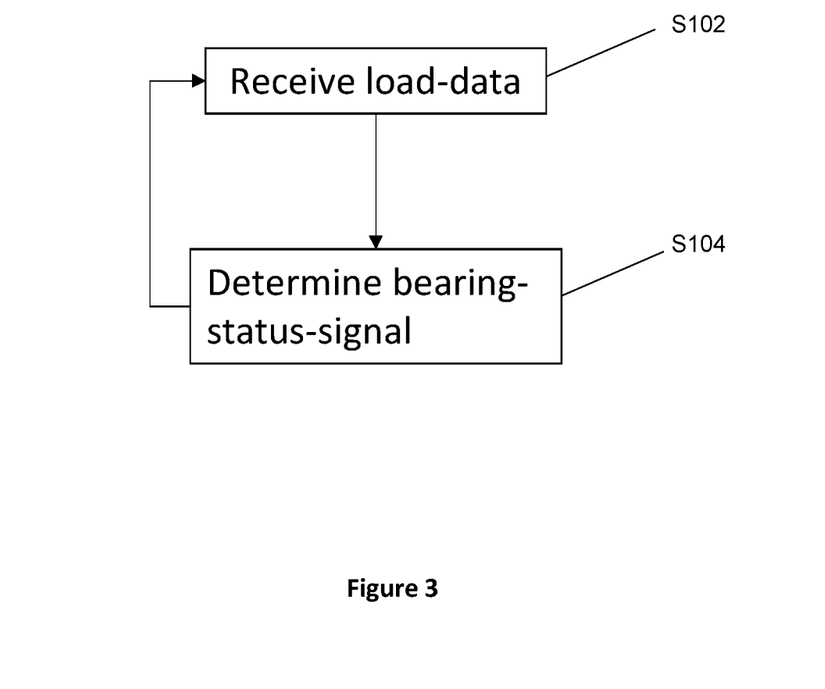
FIG. 3 is a schematic flow chart of the method for controlling an agricultural baler according to an embodiment of the present disclosure.

In FIGS. 2 and 3 the transmission 38 connects the rotary input shaft 27 to the flywheel shaft 29 at first and second selectable transmission ratios defined by driveline components within the transmission 38.

A first transmission ratios is defined by mutually meshing, rotary, toothed gears 39, 41 that each are supported for rotation within the transmission 38. The first transmission ratio is a relatively great reduction ratio transmission providing a high degree of mechanical advantage.

A second transmission ratio is defined by mutually meshing, rotary, toothed gears 42, 43 that each are supported for rotation within the transmission 38 adjacent the gears 39, 41 in a manner defining a parallel driveline to that representing the first transmission ratio. The second transmission ratio is a relatively close reduction ratio transmission providing a higher speed of output shaft rotation than the first transmission ratio.

The baler 10 includes a control unit 44, non-limitingly illustrated schematically in FIG. 1, in the form of a programmable microprocessor. The baler 10 includes a source of electrical power, for the control unit 44, that in preferred embodiments may take the form of a rotary generator that is driven directly or indirectly by the PTO shaft, although other sources of electrical power including batteries and other storage devices, or other types of generator, are possible. Combinations of electrical power sources furthermore are possible.

As indicated, the control unit may take a variety of forms and need not be a control unit as illustrated, or a single component.

The control unit 44 is capable (typically but not necessarily as a result of software and/or firmware programming) of selectively engaging the first or the second transmission ratio. The arrangement of the components and/or the programming of the control unit 44 prevents the first and second transmission ratios from being selected simultaneously.

As best illustrated in FIGS. 2 and 3, the input shaft 27 rigidly connects to an input to gear shaft 46 that is supported (non-limitingly in the embodiment illustrated by way of journal bearings 47 at either end) for rotational movement inside the transmission 38. The input gear shaft 46 is locked to the gear 42 such that the gear 42 always rotates with the input gear shaft 46.

The input gear shaft 46 is also locked to an input side 48 of first transmission clutch 49 forming part of the driveline. As a result the input side 48 of the first transmission clutch 49 also rotates with the input gear shaft 46.

The first transmission clutch 49 is e.g. electrically or electro-hydraulically activated in the described embodiment, and is selectively engageable under command from the control unit 44. When engaged the output side 51 of the first transmission clutch 49 is locked to the input side 48 and rotates therewith.

The output side 51 of first transmission clutch 49 is locked to the gear 39 of the first transmission ratio such that the gear 39 rotates with the output side 51.

In the illustrated embodiment the first transmission clutch 49 lies on the first gear shaft 46 intermediate the gears 39 and 42, but as will occur to the person of skill in the art this need not be the case, and other clutch and gear position combinations are possible.

As explained the gears 42 and 43 are mutually meshed, with the gear 43 supported on the rotational intermediate gear shaft 52. The intermediate gear shaft 52 is supported (in the non-limiting example shown by way of journal bearings 53 at either end) for rotation relative to the remainder of the transmission 38.

By reason of locking of the input gear shaft 46 to the gear 42, the gear 43 rotates whenever the input gear shaft 46 rotates, at a speed, relative to the speed of the input gear shaft 46, determined by the gear tooth ratio between the gears 42 and 43. However, the gear 43 merely idles unless a second transmission clutch 54, which may be of a similar design to the first transmission clutch 49 and hence operable under command of the control unit 44, is engaged.

In this respect, the intermediate gear shaft 52 is locked to an input side 56 of second transmission clutch 54; and an output side 57 is locked to the gear 43. As a result, when the clutch is engaged, rotation of gear 43 is transmitted via the intermediate gear shaft 52.

The gear 39 is meshed with the gear 41 as explained. The gear 41 is locked to the intermediate gear shaft 52. Clearly, therefore, to avoid locking up of the transmission it is essential that only one of the transmission clutches 49, 54 is engaged at a time. When the first transmission clutch 49 is engaged and the second transmission clutch 54 is disengaged, drive from the input shaft 27 is transmitted via the meshed gears 39 and 41 to drive intermediate gear shaft 52 in accordance with the first, reduction transmission ratio "G1" determined by the numbers of teeth of gears 39 and 41. At this time, the gears 42 and 43 rotate in an idling manner.

When the first transmission clutch 49 is disengaged and the second transmission clutch 54 is engaged, the drive of the input shaft 27 is transmitted via the gears 42 and 43 to the drive intermediate gear shaft 52 in accordance with the second transmission ratio "G2" determined by the numbers of teeth of the gears 42 and 43.

As explained herein, the first transmission ratio G1 is a reduction ratio in which the speed ratio exceeds 1. This provides a beneficial mechanical advantage when moving the flywheel 28 from rest. The second transmission ratio G2 is an accelerative ratio the speed ratio of which is a value less than 1. This causes rotation of the flywheel shaft 29 to be at a higher speed than that of the PTO shaft 13.

It is possible for both the clutches 49, 52 to be disengaged simultaneously. In that case gears 42 and 43 would rotate, but no drive would be transmitted to intermediate gear shaft 52.

The intermediate gear shaft 52 includes, mounted thereon, an optional brake 58 that may be employed when both the transmission clutches 49, 52 are disengaged to slow the flywheel shaft 29. The latter receives the rotary drive of intermediate gear shaft 52, when one of the transmission clutches 49, 54 is closed, via meshed output gears 59, 61.

The numbers of teeth of the gears 39, 41, 42, 43, 59 and 61 may be varied extensively in all the gears of the transmission 38 depending on the precise design of the transmission 38. The overall numbers of drive-transferring components in the transmission may be varied. Also as explained the driveline elements defining the transmission ratios need not be meshing, toothed gears and instead may adopt a range of other forms, including but not limited to the examples given above.

The transmission clutches 49 and 54 may be for example electrically (e.g. solenoid) operated, electro-mechanically operated or electro-hydraulically operated, under the control of the control unit 44. Preferably, but not essentially, the transmission clutches 49, 54 are spooled wet clutches the nature of which is familiar to the person of skill in the art and therefore does not require describing in detail herein. Wet clutches generally are highly suitable for computer or other electronic control, leading to rapid clutch engagement and disengagement.

One form of control of the transmission clutches 49, 54 is by electrical control signals transmitted from the control unit 44 to the first and second transmission clutches 49, 54. One form of control of the transmission clutches 49, 54 is illustrated schematically by electrical control signal line 66 (FIG. 1) that transmits commands from the control unit 44 to first transmission clutch 49; and control line 67 that transmits commands from the control unit 44 to second transmission clutch 54.

Two-way communication between the transmission clutches 49, 54 and the control unit 44 optionally is possible. Using two-way control, the transmission clutches 49, 54 can signify e.g. their operational (i.e. engaged or disengaged) status, information on the condition of wear parts such as friction plates, levels of clutch fluid in the event of the clutches being wet clutches as is preferred and similar operational variables. The control unit 44 can generate commands and/or warning signals in dependence on the signals received from the transmission clutches 49, 54.

The control unit 44 may further be connected to a rotational speed sensor 68 and/or an oil temperature sensor 73 via electric signal line 74.

The control unit 44 is capable of selectively disengaging the rotary drive between the input shaft 27 and the shaft 29 supporting the flywheel 28. This possibility is explained further below in connection with operational sequences made possible by the apparatus of the invention. The control unit 44 may also be capable of selectively activating the brake 58 of the transmission 38. Activation of the brake 58 will actively slow the rotational speed of the flywheel shaft 29 and thus the speed of the flywheel 28 connected to the flywheel shaft 28.

The baler 10 optionally may include one or more input devices 77, represented schematically and non-limitingly in FIG. 1, by means of which information on the energy transmitted via the power take-off shaft 13 may be input to the control unit 44.

In FIG. 1 an input device 77 is shown in the form of a keypad connected to the control unit 44 via an electrical cable 78, and using which e.g. the rated power output of the tractor 11 can be input to the baler 10. The control unit can select a set of decision values (such as the preferred speed of plunger 23 at which to transition from the first transmission ratio 39, 41 to the second transmission ratio 42, 43) that are optimised for the input power level.

The input device 77 may take a variety of other forms. These include but are not limited to a code reader that can read a code printed or affixed on part of the tractor 11, e.g. adjacent the PTO; a near-field communications (NFC) device that establishes a communications link with a control unit forming part of the tractor 11 in order to download power output information; or a cable connection between the control unit 44 and a counterpart control unit forming part of the tractor 11.

The transmission 38 in preferred embodiments includes a rigid housing 79 that may be formed e.g. by casting from a metal alloy, especially a high stiffness, lightweight alloy.

As explained the baler 10 includes a number of frame elements 17. The housing 79 may be positioned to interconnect two or more such frame members (e.g. frame members 17a and 17b as non-limitingly illustrated in FIG. 1) in a manner enhancing the stiffness of the frame 17 of the baler 10.

In the illustrated embodiment such interconnection is achieved by way of perforated lugs 81, 82 by means of which the housing 79 is bolted to interconnect two frame members, but as will be apparent to the person of skill in the art such interconnection may be achieved to in a variety of alternative ways.

The layout of the components of the transmission 38 inside the housing 79 is such that the driveline components 39, 41 defining the first transmission ratio occupy a first vertically extending distance in the housing 79; and the driveline components 42, 43 defining the second transmission ratio occupy a second vertically extending distance in the gearbox housing, the upper limit of the second vertically extending distance terminating below the upper limit of the first vertically extending distance.

This means that the transmission 38 is compact in the longitudinal dimension of the baler 10, and also that the output of the transmission 38 is connected to the flywheel shaft 29 at a relatively high point in the baler 10. This provides several advantages in terms of transferring drive input via the input shaft 27 to the location of the plunger 23, which as mentioned is located relatively high inside the baler 10.

Turning to FIG. 3, there is shown a schematic flow diagram of a method according to the present disclosure that may be implemented in the control unit 44 described above. The method is preferably used throughout the baling process and helps in identifying and/or preventing inadvertent bearing failures.

In a first step S102, a control unit 44 may continuously or intermittently receive load-data from one or more load sensors of the agricultural baler. In the above example of FIG. 1, the load-data may be provided by the load cells arranged on both sides of the drive converter 31, e.g. on the first, right side conrod 36 and on the second, left side conrod. In one example, the load cells may be implemented as force transducers, which provide an electric signal dependent on the force acting on the plunger during operation. Of course, the load-data may also be provided in any other way that provides the control unit with information about the loads acting on the plunger.

Figure 4:
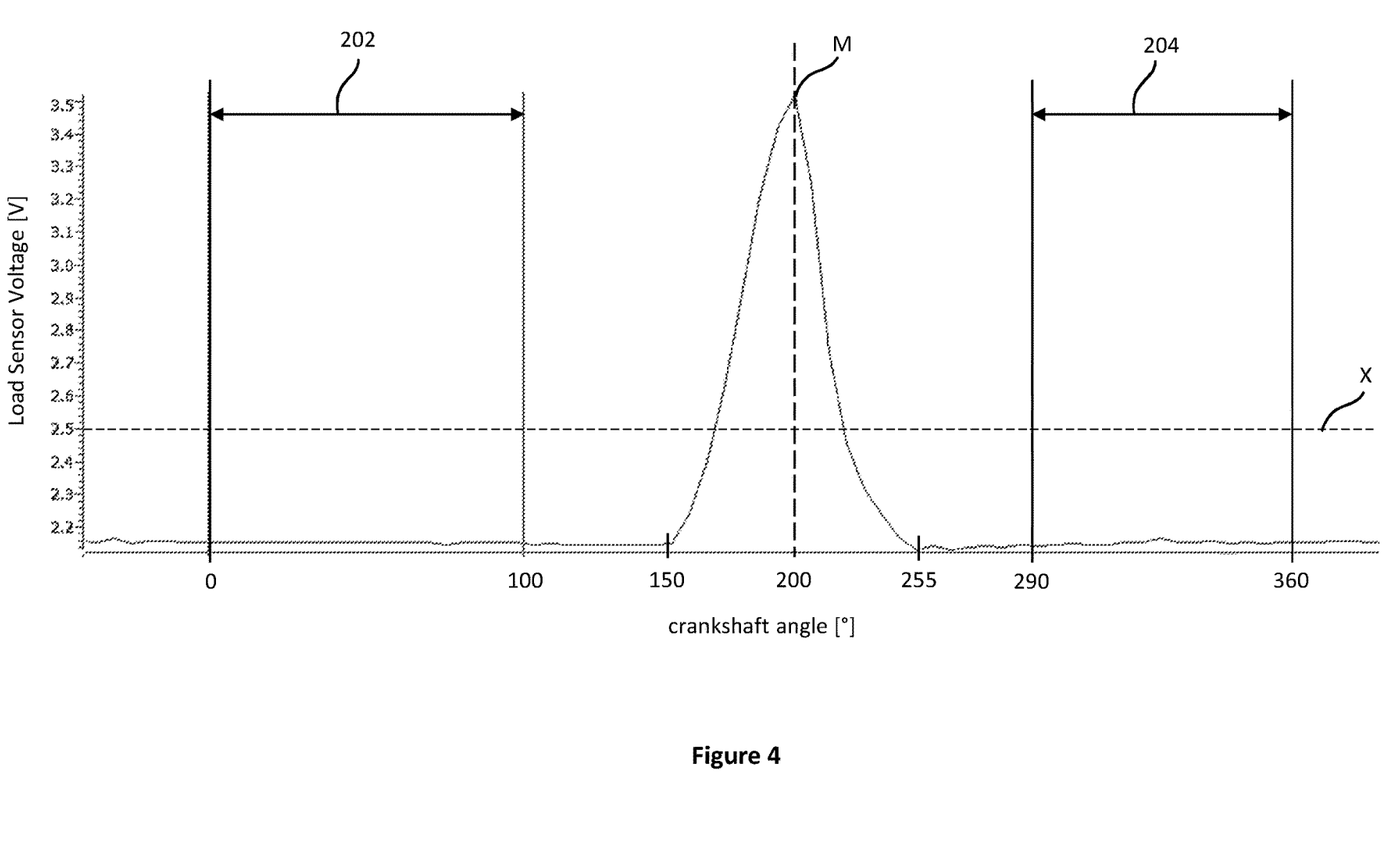
FIG. 4 is an example of plunger load-data representative of a single plunger stroke of an agricultural baler.

A typical example of load-data received in step S102 is illustrated in FIG. 4. In the embodiment of FIG. 4, the load-data is a voltage measurement provided by a load sensor, such as the load cells discussed above. The diagram of FIG. 4 shows load-data across one reciprocating stroke of the plunger within the bale-forming chamber. The movement of the plunger within the bale-forming chamber is represented by the crankshaft angle on the horizontal axis of FIG. 4. Of course, any other measurements representative of the movement of the plunger, such as a crank angle or the actual position of the plunger within the bale-forming chamber, or even a timing of the baling process may equivalently be used.

FIG. 4 shows load-data in which, for most of the reciprocating stroke, the voltage value is below about 2.2V. These measured load values (e.g. voltage measurements) may be representative of a part of the plunger stroke during which the plunger is not in contact with the plant matter within the bale forming chamber. The force measured by the load sensors and represented by the load values of around 2.2V may be caused by friction resisting movement of the plunger within the bale-forming chamber, rather than due to the compression of plant matter. Such resistance may be due to friction of the plunger against the walls of the bale chamber or friction within the driveline (e.g. within bearings) connecting the plunger to the PTO shaft of the corresponding tractor 11.

A peak in load detected by the sensor is derivable from FIG. 4, which indicates a time period during which the plunger is in contact with and compresses the plant matter (e.g. a flake of crop) within the bale-forming chamber. Of course, when the plunger contacts the plant matter within the bale-forming chamber, the load acting on the plunger increases, due to the reactive force of the compressed plant material. This causes a steep rise of load determined by the load cells. When the plunger is fully extended and thus applies the highest compressive load to the plant matter, a high-point M is reached. The high-point M, at which a maximum load (represented by about 3.5V load sensor Voltage) acts on the plunger, is a turning point. From this high-point M onwards, the plunger is retracted, resulting in a drop of plunger load as can be derived from FIG. 4.

Once the plunger has been fully removed from the plant matter, the load values determined by the load sensor drop to the base value of around 2.2V, again. These base values of 2.2V are observed when the plunger is not in contact with the plant matter. Load values that are measured during a phase of the stroke when the plunger is not in contact with the plant matter may be considered as "non-contact-load-values". In other words, the "non-contact-load-values" are load values received when the plunger is moving freely within the bale forming chamber. Collectively, the "non-contact-load-values" make up "non-contact-load-data", which is representative of load-data during each phase of the stroke when the plunger is not in contact with the plant matter. It should be appreciated that the magnitude of the non-contact-load-values (i.e. the load values during non-contact phases) may change depending on the position of the plunger within the bale forming chamber. Furthermore, the magnitude of the non-contact-load-values may also change depending on internal resistances/friction within the driveline moving the plunger through the bale forming chamber. In general, the magnitude of the non-contact-load-values will increase with increasing resistance within the driveline. By contrast, the smoother the baler runs, the lower the magnitude of the non-contact-load-values will be.

In one example, the non-contact-load-data may be defined as load values measured by the load sensors during retraction of the plunger. It will be appreciated that most of the retraction cycle of the plunger will be a plunger motion in which the plunger is not in contact with the plant matter, such that most of the load values read by the load sensors during retraction may be considered as non-contact-load-values.

There may be various ways of identifying when the plunger is retracting in the bale forming chamber. In one example, an angular position of the crankshaft or the corresponding to crank member driving the plunger may be used by a control unit as plunger-position-data which is representative of a position of the plunger within the bale chamber. This plunger-position-data may thus be used to identify when the plunger is moving away from the plant material, i.e. retracting, given that a full rotation of the crankshaft and/or the corresponding crank corresponds to a full cycle of reciprocating motion of the plunger within the bale chamber. The angular position of the crank or the crankshaft can be used to determine the position of the plunger within the bale chamber.

The above may be used by a control unit to determine the non-contact-load-data within the load-data provided by the load sensors. In particular, the control unit may define any load values received from the load sensor in certain angular positions (e.g. 0-100 degrees and 290 to 360 degrees in FIG. 4) as non-contact-load-data. To this end, the angular positions may be predetermined by the manufacturer (or the operator) so as to be representative of angular positions in which the plunger is not expected to be in contact with the plant matter.

Turning back to the embodiment of FIG. 4, there are shown two parts of the plunger stroke, during which the plunger is expected not to be in contact with the plant matter. In a first interval 202, which may range between crankshaft angles of 0 degrees and 100 degrees, the plunger is not in contact with the plant matter and so it is expected that during this range of the crankshaft/plunger movement, the load values received from the load sensors will be non-contact-load-values. The first interval 202 may be representative of a plunger extension before plant matter is contacted.

A second interval 204, which may be between crankshaft angles of 290 degrees and 360 degrees describes another phase, during which the plunger is not in contact with the plant material. The second interval may be representative of a plunger retraction, after the plunger is no longer in contact with the plant matter. Accordingly, just like the first interval 202, the second interval 204 marks a phase during the operation in which the load values received from the load sensor are considered to be non-contact-load-values.

It will be appreciated that the start and end angles of the intervals 202 and 204 may vary depending on the definition of the angular starting position of the crankshaft and the corresponding position of the plunger within the bale forming chamber. For example, in the embodiment of FIG. 4, the crankshaft angle of 0 degrees may be set to coincide with the beginning of the plunger extension step, i.e. before plant matter is engaged by the plunger within the bale forming chamber. In this embodiment, the first 100 degrees of crankshaft rotation may not be enough to drive the plunger far enough into the bale forming chamber to contact and compress the plant matter. Accordingly, all of the load values received from the load sensors during the first interval 202 may be considered non-contact-load-values.

Shortly after a 100 degrees of crankshaft rotation, e.g. at a crankshaft angle of around 150 degrees, the plunger will engage with the plant matter. At this point, the load values to detected by the load sensors will increase sharply as the plant matter is compressed by the plunger. The load values will increase until a maximum load value of around 3.5V has been reached at a high-point M. In the example of FIG. 4 the maximum load (e.g. maximum compression) is reached at an angular position of the crankshaft of around 200 degrees. This high-point M also coincides with the transition of the plunger movement between extension and retraction.

As the crankshaft is rotated further than 200 degrees, the plunger is retracted, i.e. removed from the plant matter, such that the load values start to decrease again. The load values decrease until the plunger is no longer in contact with the plant matter, which, in this example, is at around 255 degrees of crankshaft rotation. Any rotation of the crankshaft over 255 degrees, i.e. any further retraction of the plunger from the bale forming chamber, will no longer be in contact with the plant matter, such that any load values determined by the load sensors at crankshaft angles higher than 255 degrees may again be considered to be non-contact-load-values until the plunger stroke has been fully completed at 360 degrees.

It will be understood that the first and second intervals 202, 204 are examples of angular ranges of crankshaft rotation that may confidently be considered as phases during the plunger stroke in which the plunger is not in contact with plant matter. A control unit may thus consider any load value determined during these two intervals 202, 204 as non-contact-load-values. The first interval 202 returns non-contact-load-values that are act on the plunger during the extension, whereas the second interval 204 returns non-contact-load-values that act on the plunger during the retraction. In the example of FIG. 4, the load values during the first and second intervals 202, 204 are roughly identical (around 2.2V). However, it will be appreciated that the load values determined during the two intervals 202, 204 may also differ significantly due to different resistances to the plunger motion between the extension and the retraction phases.

There may be various other ways of defining phases of the plunger stroke in which the load sensors return non-contact-load-values. In one example, the control unit may use image-data from an optical sensor within the bale forming chamber to determine whether or not the plunger is currently in contact with plant matter. Accordingly, the control unit may define any load values received from the load sensors at the time when the plunger is not in contact with the plant matter (e.g. as confirmed by the optical sensor), as non-contact-load-values, which are thus part of the non-contact-load-data. In the example of FIG. 4, however, the control unit will automatically define any load value determined during one of the two intervals 202, 204 of each stroke as non-contact-load-values. The angular ranges, during which the control unit will expect to receive non-contact-load-values, may be predefined by the manufacturer and/or the operator. In other words, the control unit may receive load-data that includes load-values and the corresponding plunger-position-values. The control unit may define any of the to load-values that are received in plunger positions within the predetermined (non-contact) plunger-position-ranges as non-contact-load-values.

The non-contact-load-data does not necessarily need to be based on ranges of crankshaft angles. Rather, any measurements representative of the plunger movement within the baler chamber may be employed to predetermine which load values are defined as non-contact-load-values by the control unit. These ranges may be intervals of crankshaft angles, crank angles, or even time intervals, all of which are representative of the position of the plunger within the bale chamber. These angle or time values may be provided to the control unit as plunger-position-data throughout the operation of the baler. Accordingly, the control-unit may be configured to define certain range (i.e. angles or times) of the plunger-position-data as intervals in which non-contact-load-values will be received from the load cells.

In view of the above, it will be understood that the load-data may comprises one or more of the load sensor voltage over the crankshaft angle, the load sensor voltage over time, and the load sensor voltage over the plunger position. Accordingly, the control unit may either use one or more ranges of crankshaft angles (as explained above), or one or more time intervals, or one or more ranges of plunger locations as pointers for identification of non-contact-load-values within the load-data.

Turning back to FIG. 3, the method of the present disclosure includes a second step S104 for determining a bearing-status-signal. The bearing-status-signal is indicative of a wear status of a bearing on the baler, and is determined on the basis of the load-data received. In one example, the bearing-status-signal may be indicative of the wear status of bearings arranged on the conrods of the baler that connect the crank members of the crankshaft with the plunger. This is on the basis that the loads measured by the load cells will change as the bearings deteriorate. Generally, as the bearings deteriorate, the load values determined by load cells will increase, such that unexpectedly high load values may be used as an indicator for bearing failure, which may then be used to produce a corresponding bearing-status-signal.

The bearing-status-signal may be determined on the basis of parts of the load-data, such as the non-contact-load-values described above. Alternatively, the bearing-status-signal may be determined on the basis of the entire load-data provided to the control unit. That is, during step S104, the control unit may either compare parts of or the entire load curve of the load-data depicted in FIG. 4 with expected load values to determine the bearing-status-signal. In the following, however, determination of a bearing-status-signal taking into consideration the second interval 204 only shall be described in more detail, as this approach may provide more accurate results than a comparison of the full load-data to an expected load curve.

As described above, when considering suitable parts of the load-data, a first step in determining the bearing-status-signal may be an identification of non-contact-load-values to within the load-data provided to the control unit. In the following example, the control unit may identify any load values presented in the load-data that fall within the second interval 204 as non-contact-load-values for the determination of the bearing-status-signal. As mentioned before, the non-contact-load-values of the second interval 204 of the embodiment shown in FIG. 4 are expected to be around 2.2V and, in any case, no higher than 2.5V. This is because in the angular range of the second interval 204 (i.e. between 290 degrees and 360 degrees of crankshaft rotation) no contact between the plunger and the plant matter within the bale forming chamber is expected, such that the loads determined by the load sensors are mainly due to the friction within the driveline between the load sensors and the plunger or between the plunger and the walls of the bale chamber. If this non-plant-matter-contact-friction increases due to mechanical failure of one or more of the driveline parts (e.g. the bearings connecting the conrods to the plunger and/or the crank arm), the load values for the second interval 204 of the plunger stroke may increase, thereby providing an indication of mechanical failure. In most cases, an increase in load in the non-contact-load-values is due to bearing deterioration or even bearing failure.

In view of the above, the present disclosure suggests monitoring the non-contact-load-values in order to detect bearing failure before it significantly affects the operation of the baler and/or to mitigate negative impacts of bearing failure as swiftly as possible. To this end, the method of the present invention compares one or more of the non-contact-load-values (e.g. the load values within the second interval 204 of FIG. 4) to a first predetermined load threshold, such as a first load threshold X indicated in FIG. 4. The first predetermined load threshold X of FIG. 4 is set to 2.5V. As explained above, this load value of 2.5V indicates a load that should never be reached during non-contact phases of the plunger stroke, unless there is a mechanical failure within the driveline between the load cells and the plunger. As will be appreciated, none of the non-contact-load-values in the second interval 204 of FIG. 4 exceed the first load threshold X. Accordingly, the control unit may determine a bearing-status-signal indicating that no maintenance of the bearings is required, and the operation may proceed normally. Generally, FIG. 4 shows an example of a typically expected load-data signal throughout the entire stroke of the plunger. Accordingly, the load-data signal of FIG. 4 does not indicate a bearing failure within the driveline.

Figure 5:
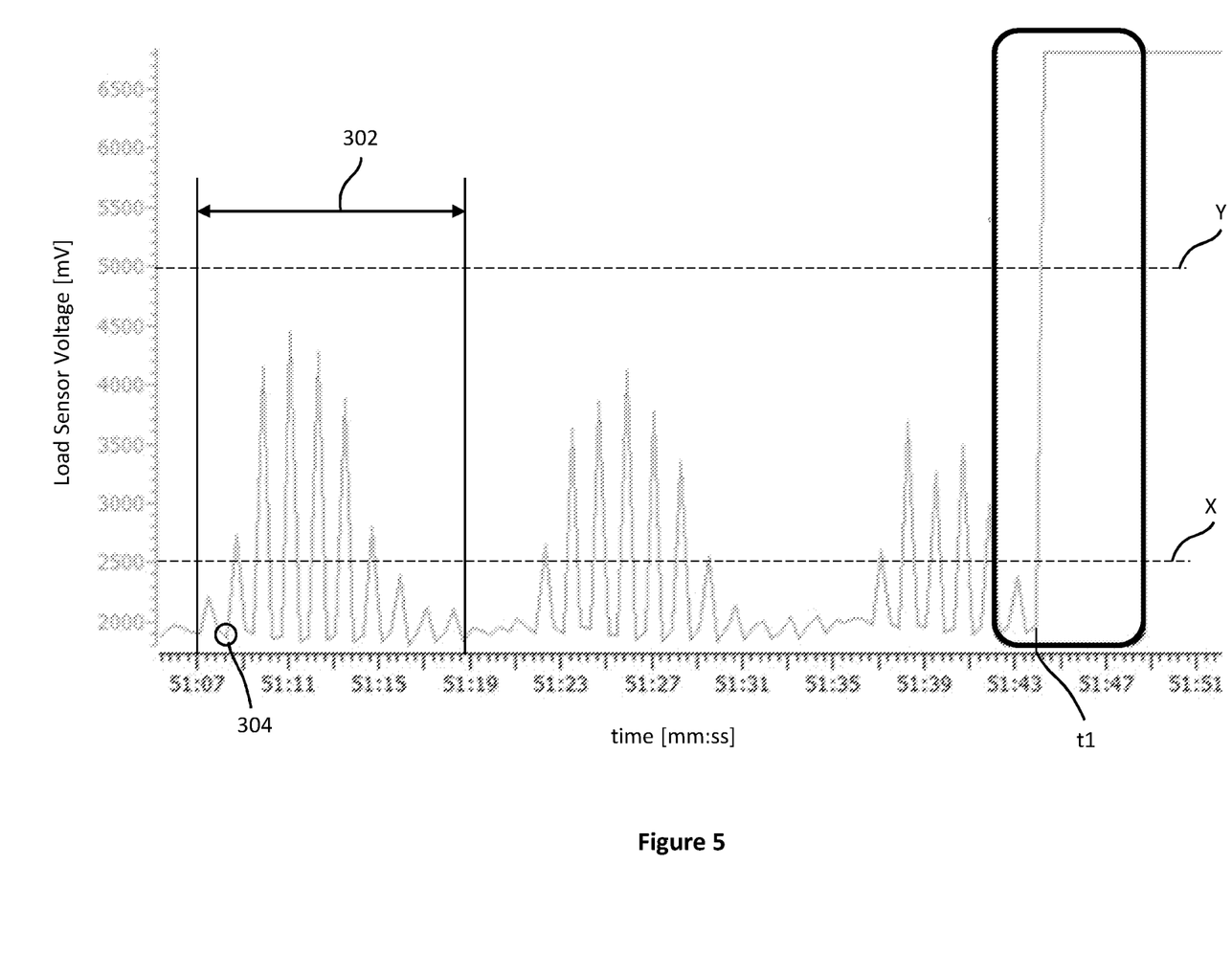
FIG. 5 is an example of plunger load-data representative of a range of plunger strokes.

An example of load-data showing a sudden bearing failure is shown in the embodiment of FIG. 5. FIG. 5 illustrates the load sensor voltage (in mV) over time for a number of strokes during a typical baling process. FIG. 4 shows three different peak clusters, such as the first peak cluster 302. Each peak cluster may be representative of the compression of one flakes within the bale chamber. The first peak cluster, for example, shows ten peaks, indicating that ten plunger strokes were completed during the first peak cluster 302. Similar to the intervals 202, 204 shown in FIG. 4, the load peaks of FIG. 5 are connected by load troughs, to such as a first trough 304, corresponding to non-contact-load-values. The first peak cluster 302 does not show any irregularities on any of the non-contact-load-values that are shown as troughs.

As will be appreciated, all of the troughs (e.g. non-contact-load-values) show load values below 2.5V, i.e. below the first predetermined threshold X. Accordingly, during the first peak cluster 302, the load-data does not indicate a bearing failure and so the control unit will generate bearing-status-signals indicating that the wear status of the bearing is as expected.

The bearing status is as expected until a time t1, at around 51 minutes and 44 seconds, at which a sharp rise in load values is derivable from the load-data. The load values after time t1 significantly exceed the first threshold X, even during plant matter compression phases of the plunger stroke. In the example of FIG. 4, the loads after time T1 have reached a magnitude of 7V, which may be indicative of a sudden bearing failure that requires immediate attention. Bearing failures, particularly within the conrod bearings of the plunger, are extremely dangerous due to a likely temperature increase within the bearings that can easily lead to fires within the baler due to the highly flammable dried plant matter within the machine.

The control unit may identify this bearing failure very swiftly, e.g. within milliseconds (i.e. less than one stroke) and react accordingly. In one example, if the non-contact-load-values, such as the load values shown in the second interval 204 in FIG. 4, only exceed the first threshold X by a predetermined amount (e.g. higher than the first threshold X but less than a second threshold described below with reference to FIG. 5), the control unit may determine a bearing-status-signal that is indicative of a bearing starting to deteriorate and may not yet require shut down of the entire agricultural baler. Instead, the control unit may be configured to automatically alarm the operator if one or more of the non-contact-load-values exceed the first predetermined load threshold and stay below a second threshold Y, which will be explained in more detail below. Alternatively, or additionally, the control unit may automatically request a bearing service if one or more of the non-contact-load-values are between the first predetermined load threshold X and the second predetermined load threshold Y. To this end, the control unit may be able to determine a bearing-status-signal that indicates that maintenance on the bearings, such as the conrod bearings, of the baler is required. The control unit may, on the basis of such a bearing-status-signal, generate a maintenance-signal to inform the operator or the manufacturer (e.g. via transmitters of the agricultural baler or the tractor) when one or more of the non-contact-load-values are between the first and second thresholds X, Y. Alternatively, the control unit may be configured to determine a bearing-status-signal that may be applied to shut down the baler instantly as soon as one or more of the non-contact-load-values exceed the first threshold X, even if they do not exceed the second threshold Y.

In the scenario of FIG. 5, the significant load increase at time T1 may indicate that a full bearing failure has occurred, such that the bearing-status-signal determined by the control to unit may indicate that a baler shut down is required. Consequently, in some embodiments, the control unit may also compare the non-contact-load-values to a second predetermined load threshold Y, which is higher than the first load threshold X. If the non-contact-load-values exceed the second predetermined load threshold Y (and thus also the first threshold X), the control unit may determine a bearing-status-signal that may be applied to automatically stop an operation of the agricultural baler. The second load threshold Y in this example may be set to around 5V. The second load threshold Y may be higher than any of the peak load values expected when compressing plant matter during normal operation, i.e. without bearing failures.

Various ways of stopping the baler in case of an emergency, e.g. if one or more of the non-contact-load-data values exceed the first or second predetermined threshold X, Y, are described in detail below with reference to the baler 10 described in FIGS. 1 and 2.

As a primary remedial action, in case the load values exceed the first and/or the second threshold X, Y, the control unit 44 can command disengagement of the first transmission clutch 49, thereby disengaging the driveline via the first transmission ratio. When the first transmission clutch 49 is a solenoid-driven spooled wet clutch, as is preferred, such disengagement may be effected very rapidly, before the bearing failure causes serious damage such as internal fires.

At the same time as disengaging the clutch 49, the control unit 44 may take further remedial action and use the brake 58 of the transmission 38 to actively brake the flywheel 28 so as to stop the plunger operation as quickly as possible. It should be appreciated that disengagement of the clutch will interrupt power supply from the input shaft 27 to the flywheel 28 and ultimately to the plunger 23. However, the PTO shaft 13 may still continue to provide power to one or more hydraulic pumps (not shown), which are arranged in front of the transmission 38. Therefore, the ability to disconnect the clutch 49 to stop the plunger operation does not affect the working of the hydraulic pumps of the baler 10. The hydraulic pumps may, thus, still be used to pump cooling fluid around the baler, thereby decreasing heat generation and fire hazards. The pumps may also be used to supply hydraulic fluid to the brake 58 to slow the flywheel 28 more effectively if a bearing failure is detected.

The listing or discussion of an apparently prior-published document in this specification should not necessarily be taken as an acknowledgement that the document is part of the state of the art or is common general knowledge.

Preferences and options for a given aspect, feature or value of the invention should, unless the context indicates otherwise, be regarded as having been disclosed in combination with any and all preferences and options for all other aspects, features and parameters of the invention.

The invention claimed is:

1. An agricultural system comprising:
    an agricultural baler comprising:
        a bale-forming chamber;
        a plunger movable in a reciprocating manner within the bale-forming chamber for compressing plant matter in the bale-forming chamber; and
        a driveline for moving the plunger within the bale-forming chamber, the driveline comprising at least one bearing; and
    a control unit configured to:
        receive load-data indicative of a load acting on the plunger during operation of the baler; and
        determine a bearing-status-signal indicative of wear status of the at least one bearing, based on the load-data.

2. The agricultural system of claim 1, wherein determining the bearing-status-signal comprises identifying non-contact-load-values, representative of load values of the load-data that correspond to phases during operation of the plunger in which the plunger is not in contact with the plant matter.

3. The agricultural system of claim 2, wherein the non-contact-load-values correspond to load values of the load-data during retraction of the plunger.

4. The agricultural system of claim 2, wherein the driveline comprises a crankshaft and at least one crank member for converting rotational motion of a crankshaft into a reciprocating motion of the plunger, and wherein identifying non-contact-load-values comprises identifying load-data associated with predetermined angular positions of the at least one crank member or the crankshaft.

5. The agricultural system of claim 2, wherein determining the bearing-status-signal comprises comparing one or more of the non-contact-load-values to a first predetermined load threshold.

6. The agricultural system of claim 5, wherein the control unit is further configured to generate a maintenance-signal for informing the operator or requesting a bearing service if one or more of the non-contact-load-values exceed the first predetermined load threshold.

7. The agricultural system of claim 5, wherein determining the bearing-status-signal comprises comparing one or more non-contact-load-values to a second predetermined load threshold, and wherein the control unit is further configured to automatically stop an operation of the agricultural baler, if one or more of the non-contact-load-values exceed the second predetermined load threshold.

8. The agricultural system of claim 5, wherein determining the bearing-status-signal comprises comparing one or more non-contact-load-values to a second predetermined load threshold, and wherein the agricultural baler further comprises an input shaft and a flywheel, wherein the driveline further comprises at least one clutch arranged between the input shaft and the flywheel, and wherein the control unit is further configured to automatically disengage the clutch, if one or more of the non-contact-load-values exceed the first or the second predetermined load threshold.

9. The agricultural system of claim 5, wherein determining the bearing-status-signal comprises comparing one or more non-contact-load-values to a second predetermined load threshold, and wherein the agricultural baler further comprises an input shaft and a flywheel, wherein the driveline further comprises at least one brake, and wherein the control unit is further configured to automatically activate the brake, if one or more of the non-contact-load-values exceed the first or the second predetermined load threshold.

10. The agricultural system of claim 1, wherein the agricultural baler further comprises a sensor arrangement for generating the load-data, the sensor arrangement comprising at least one load sensor configured to determine values of the load-data during operation of the baler.

11. The agricultural system of claim 10, wherein the driveline further comprises a crankshaft and at least one crank member for converting rotational motion of the crankshaft into a reciprocating motion of the plunger, and wherein the at least one load sensor is arranged between the at least one crank member and the plunger.

12. The agricultural system of claim 11, wherein:
    the driveline comprises at least one conrod for connecting the at least one crank member to the plunger,
    the conrod has a first end connected to the at least one crank member via the at least one bearing,
    the conrod has a second end connected to the plunger via the at least one bearing, and
    the load sensor is connected to the at least one bearing.

13. The agricultural system of claim 10, wherein the at least one load sensor is a force transducer for converting the load acting on the plunger into an electrical signal.

14. A computer-implemented method for controlling an agricultural baler, said baler comprising:
    a bale-forming chamber;
    a plunger movable in a reciprocating manner within the bale-forming chamber for compressing plant matter in the bale-forming chamber; and
    a driveline for moving the plunger within the bale-forming chamber, the driveline comprising at least one bearing,
    wherein the method comprises:
        receiving load-data indicative of a load acting on the plunger during operation of the baler; and
        determining a bearing-status-signal indicative of wear status of the bearing, based on the load-data.

\* \* \* \* \*